Figure 1:
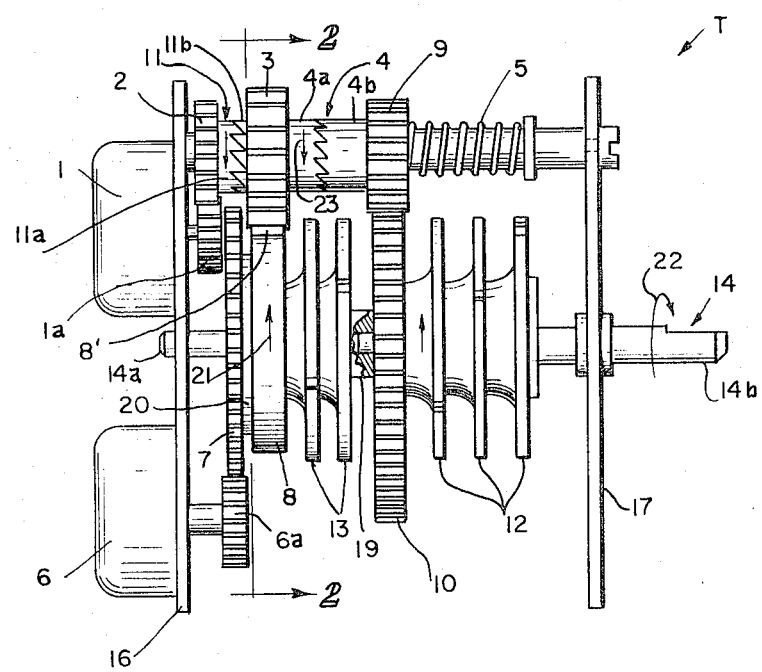

United States Patent [19]
Bertozzi et al.

[11] 3,853,015
[45] Dec. 10, 1974

[54] CONTROL DEVICES FOR SLOW AND FAST ADVANCEMENTS FOR ELECTROMECHANICAL TIMERS

[76] Inventors: Marcello Bertozzi, No. 47, Via Brighindi; Mario Chioffi, No. 84, Via Marittima 1, both of Frosinone, Italy

[22] Filed: Dec. 3, 1973

[21] Appl. No.: 420,902

[52] U.S. Cl. .................. 74/112, 74/568 T, 74/661, 74/436, 192/48.5
[51] Int. Cl. ............................................. F16h 27/00
[58] Field of Search ...... 74/112, 665 F, 665 G, 661, 74/436, 125.5, 568 T; 192/48.5

[56] References Cited
UNITED STATES PATENTS

| | | | |
|---|---|---|---|
| 2,009,383 | 7/1935 | Blume | 74/112 |
| 2,781,674 | 2/1957 | Kaerger | 74/661 |
| 2,924,317 | 2/1960 | Holstein | 192/48.5 |
| 2,980,326 | 4/1961 | Crooke | 74/112 |
| 3,156,123 | 11/1964 | Denny | 74/568 T |
| 3,195,373 | 7/1965 | Fisher | 74/125.5 |
| 3,386,636 | 6/1968 | Badalich | 74/112 |
| 3,683,719 | 8/1972 | Gros | 192/48.5 |

FOREIGN PATENTS OR APPLICATIONS

| | | | |
|---|---|---|---|
| 352,729 | 3/1961 | Switzerland | 74/436 |

*Primary Examiner*—Samuel Scott
*Assistant Examiner*—Wesley S. Ratliff, Jr.
*Attorney, Agent, or Firm*—Charles W. Hoffman; Robert F. Meyer; Donald W. Hanson

[57] ABSTRACT

Two one-way clutches provide for rapid advancement of a cam stack and independent manual rotation of the cam stack.

4 Claims, 2 Drawing Figures

CONTROL DEVICES FOR SLOW AND FAST ADVANCEMENTS FOR ELECTROMECHANICAL TIMERS

Generally speaking this invention relates to a timing mechanism comprising a housing, a first shaft journaled for rotation in the housing, a first electric motor carried by the housing, a first cam means rotatably carried by the first shaft and rotatable by the first electric motor, a second electric motor carried by the housing and coupled for rotation of the first cam means at a faster rate than by the first motor through a first one-way clutch means, a second shaft carried by the housing, a second cam means rotatably carried by the housing and rotatable by the first electric motor at a faster rate than by the first cam means, and a second one-way clutch means coupled between the first electric motor and the first cam means, whereby the first cam means may be rotated in one direction by manually turning the first shaft and allowing the second clutch to break coupling of the first cam means with the first and second motors.

Timing mechanisms of the type herein described are widely used in the appliance industry for controlling the sequential operation of washers, dryers, dishwashers, etc. In many such applications it has been found to be desirable to rapidly advance the cam stack of the timer so that operations may be "skipped" as desired. Further it is also desirable to provide for a means to manually rotate the cam stack independent of its power driven rotation. These requirements tend to make timing mechanisms complicated, difficult to produce, and costly.

Accordingly, the present invention is directed to a timing mechanism which provides two speed power driven advancement of a cam means and independent manual advancement of the cam means and has as a feature the provision of such a timing mechanism which is simple and easy to produce. Another feature of the present invention is the provision of a timer wherein a cam means is driven by two separate motors through a clutch means and wherein manual rotation of the cam means is effected through a second clutch means.

A further feature of the invention is the provision of a timing mechanism wherein a first cam means is power driven by two separate motors through a first clutch means, a second cam means is power driven by one of the motors, the first cam means being manually rotated independently of the motors through a second clutch means which is functionally disposed between one of the motors and the first cam means.

Figure 2:
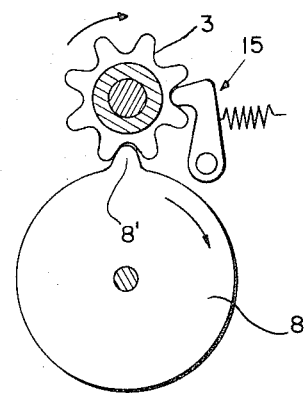

These and other features of the invention will become apparent from the following description taken in conjunction with the accompanying drawings wherein:

FIG. 1 is a view in elevation of a timing mechanism showing the features of the invention; and FIG. 2 is a view taken along the line 2—2 of FIG. 1.

Referring now to the drawings the timing mechanism T in general includes a first and second cam means 12 and 13 carried on shaft 14, first and second motors 1 and 6 carried on end plate 16 of the timerhousing, one-way clutch means 4 and 11, and a means to impart step by step advancement of first cam means 12 which includes gear 8, gear 3, and spring biased pawl 15. Shaft 14 is composed of two sections 14a and 14b. Section 14a is fixedly carried at one end in end plate 16, while section 14b is rotatably journalled at one end in end plate 17 of the timer housing. The two sections are joined together in bushing 19 such that section 14b is rotatable independent of section 14a.

Each of the clutch means 4 and 11 included mating ratchet teeth 4a, 4b and 11a, 11b, the teeth being biased together through spring 5.

In operation, motor 6, through pinion 6a rotates gear 7 which rotates gear 8, gears 7 and 8 both being carried on hub 20. Cam means 13 is connected to gear 8 such that it will rotate in accordance with the rotation of gear 8. Gear 8 engages gear 3 through tooth 8' such that a step by step rotation is imparted to gear 3. Spring biased pawl 15 serves as a detent to insure that the gear 3 will stop at the proper location for the next step. The spring and pawl are suitably carried by the timer housing.

The step by step advancement of gear 3 causes a step by step advancement of cam means 12 through clutch means 4 and gears 9 and 10. Thus motor 6 drives cam means 12 intermittently and cam means 13 continuously. As indicated by arrows 21 and 23, the rotation of gear 8 and thus gear 3 is such that clutch means 11 becomes disengaged so that their rotation is independent of motor 1.

Motor 1 serves as a rapid advance means for cam means 12 and is normally de-energized. Motor 1 may be energized as desired through completion of electrical circuits (not shown) through switches responsive to cam means 12 or 13 or both. Motor 1 through pinion 1a drives pinion 2 to drive cam means 12 through clutch means 4 and 11 and gears 9 and 10.

Clutch means 4 permits manual rotation of cam means 12. Rotation of section 14b of shaft 12 in the direction of arrow 22 disengages clutch means 4 to permit independent rotation of the cam means 12 and gears 9 and 10.

What is claimed is:

1. A timing mechanism comprising a housing, a first shaft journaled for rotation in said housing, a first electric motor connected to said housing, a first cam means carried by said first shaft and rotatable by said first electric motor, a second electric motor connected to said housing and coupled for rotation of said first cam means at a faster rate than by said first motor through a first one-way clutch means, a second shaft carried by said housing, a second cam means rotatably carried on said second shaft and rotatable by said first electric motor at a faster rate than said first cam means, and a second one-way clutch means coupled between said first electric motor and said first cam means, whereby said first cam means may be rotated in one direction by manually turning said first shaft and allowing said second one-way clutch means to break coupling of said first cam means with said first and second motors.

2. A timing mechanism according to claim 1 further including means coupled between said first motor and said first cam means, imparting step by step advancement of said first cam means.

3. A timing mechanism according to claim 2 wherein said means imparting step by step advancement comprises:

a. a constant speed driver comprising a gear having a single tooth;

b. a driven member, having a plurality of uniformly-spaced teeth extending from an outer periphery thereof and engaged by said tooth of said constant speed driver periodically as said tooth rotates past said teeth on said driven member; and c. a spring biased detent pawl engaging said driven member to positively locate said teeth on said driven member.

4. A timing mechanism according to claim 1 wherein said first and second shafts are axially alligned and coupled together such that said first shaft rotates within said second shaft.

* * * * *